US012388793B2

(12) United States Patent
Jain et al.

(10) Patent No.: US 12,388,793 B2
(45) Date of Patent: *Aug. 12, 2025

(54) SUPPORTING LOCAL HOST TRAFFIC IN REMOTE DEVICE INFRASTRUCTURE

(71) Applicant: BrowserStack Limited, Dublin (IE)

(72) Inventors: Bipul Jain, Pune (IN); Vishal Shah, Mumbai (IN); Ryan Rehman, Kolkata (IN)

(73) Assignee: BrowserStack Limited, Dublin (IE)

( * ) Notice: Subject to any disclaimer, the term of this patent is extended or adjusted under 35 U.S.C. 154(b) by 203 days.

This patent is subject to a terminal disclaimer.

(21) Appl. No.: 18/373,796

(22) Filed: Sep. 27, 2023

(65) Prior Publication Data
US 2024/0205193 A1    Jun. 20, 2024

Related U.S. Application Data

(63) Continuation of application No. 18/082,772, filed on Dec. 16, 2022, now Pat. No. 11,888,821.

(51) Int. Cl.
| | |
|---|---|
| *H04L 29/08* | (2006.01) |
| *G06F 9/54* | (2006.01) |
| *G06F 16/955* | (2019.01) |
| *H04L 9/40* | (2022.01) |

(52) U.S. Cl.
CPC ...... *H04L 63/0281* (2013.01); *G06F 16/9566* (2019.01); *H04L 63/0236* (2013.01); *H04L 63/0272* (2013.01)

(58) Field of Classification Search
CPC ............ H04L 63/0281; H04L 63/0236; H04L 63/0272; G06F 16/9566
See application file for complete search history.

(56) References Cited

U.S. PATENT DOCUMENTS

| | | | | |
|---|---|---|---|---|
| 11,249,821 B1* | 2/2022 | Shah | ..................... | G06F 9/541 |
| 2020/0153928 A1* | 5/2020 | Chauhan | ............... | H04L 67/568 |

* cited by examiner

*Primary Examiner* — Noura Zoubair
(74) *Attorney, Agent, or Firm* — Cognition IP, P.C.; Edward Steakley; Saleh Kaihani

(57) ABSTRACT

A remote software development infrastructure can include multiple cross-continent datacenters with a variety of remote devices to choose from in the datacenters. A user can select a remote device and access the remote device via a local machine. The infrastructure can stream a video feed of the display of the remote device to the local machine. The user can run a browser on the remote device to test a website, including for example, testing accessing the website and its features via the browser running on the remote device. URL requests to the user's website are received from the local machine and injected into the browser running on the remote device. The browser running on the remote device issues the URL requests. Restricted URL requests can be modified via a browser extension and replaced with a non-restricted URL pointing to the same communication endpoint as the restricted URL.

18 Claims, 7 Drawing Sheets

FIG. 2A

SUPPORTING LOCAL HOST TRAFFIC IN REMOTE DEVICE INFRASTRUCTURE

CROSS-REFERENCE TO RELATED APPLICATIONS

This application is a continuation of U.S. patent application Ser. No. 18/082,772, filed on Dec. 16, 2022, titled "SUPPORTING LOCAL HOST TRAFFIC IN REMOTE DEVICE INFRASTRUCTURE," which is hereby incorporated in its entirety and should be considered a part of this disclosure.

BACKGROUND

Field

This invention relates generally to the field of enabling a remote infrastructure for application and website development on multiple platforms, and more particularly to testing a local network using the remote infrastructure.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given consumers a vast universe of choices. Naturally, software, application and website developers have a keen interest in ensuring their products work seamlessly across the existing platforms, including older devices on the market. This creates a challenge for the developers to properly test their products on the potential devices and platforms that their target consumer might use. On the one hand, acquiring and configuring multiple potential target devices can strain the resources of a developer. On the other hand, the developer cannot risk disregarding a potential target device in his typical development cycle. Even for prominent platforms, such as IOS® and Android®, at any given time, there are multiple generations and iterations of these devices on the market, further complicating the development and testing process across multiple platforms. This dynamic illustrates a need for a robust infrastructure that enables developers to test their products across multiple devices and platforms, without having to purchase or configure multiple devices. Described systems and techniques enable software developers to test their devices across multiple platforms, without having to invest resources in the hardware, software and configuration needed to perform multi-platform development.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

FIG. 2A illustrates an option menu, via which a user developer can choose a smartphone and a corresponding mobile browser, to test software.

DETAILED DESCRIPTION

Figure 1:
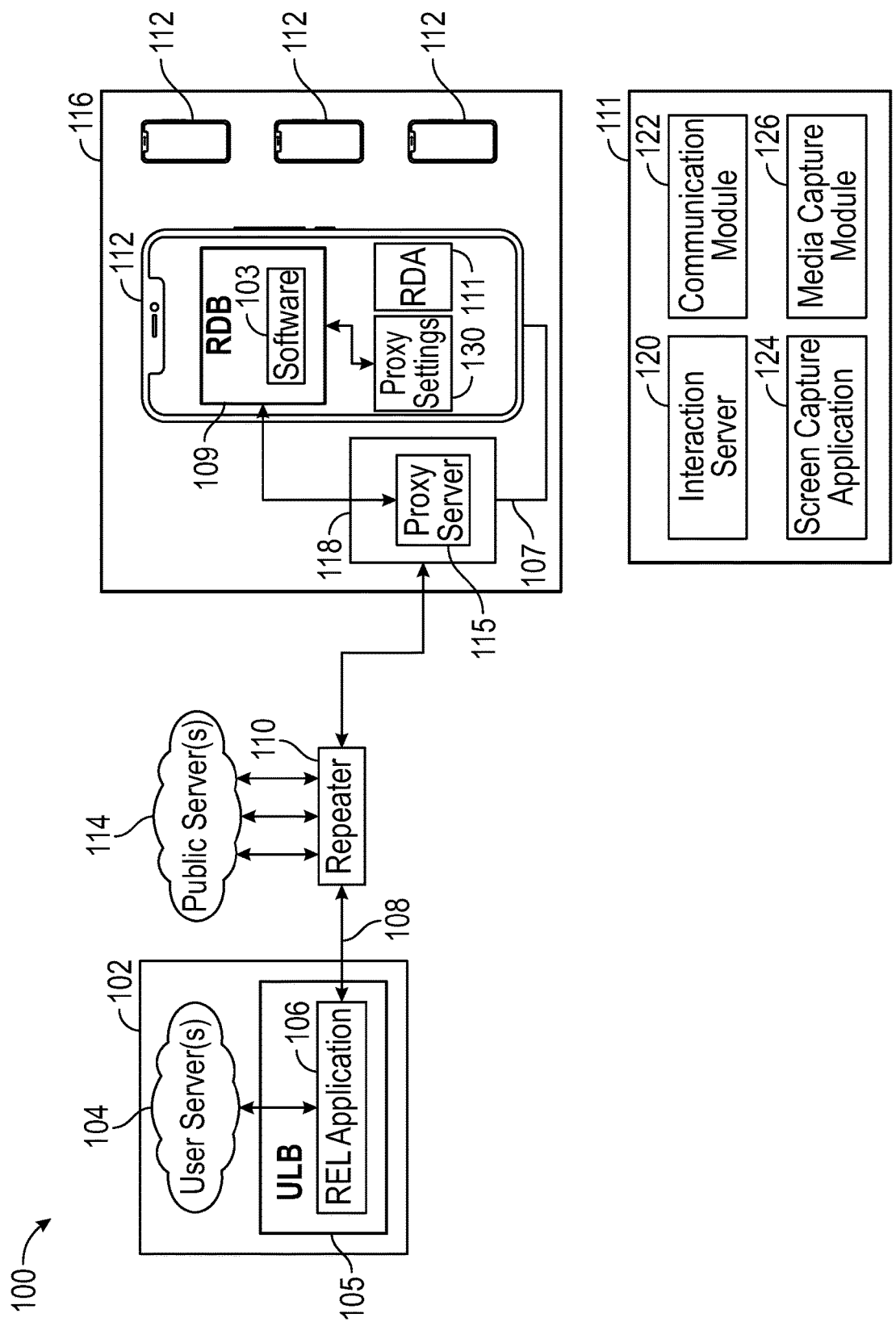
FIG. 1 illustrates a diagram of an infrastructure, enabling a software developer user to perform local software development, using remote devices.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

A critical aspect of developing software is to test the software on a variety of platforms, operating systems, and devices on which the software is going to be running. Another aspect of developing software is to develop the software in a non-public setting before launch to ensure the software meets its production goals. Local development is often used to program and debug software. In a local development environment, the development team may operate from different geographical regions, logging into a private network to code and develop the software. The private network may be closed off from the rest of the internet or may interact with the outside world through controlled mechanisms and protocols to ensure security, privacy and confidentiality of the development environment. Naturally, software development in many cases, require both interaction with public servers on the internet, and testing the software on a multitude of platforms and devices making calls and interacting with private and public sources. For example, the developer a website may wish to test the interactions of the website with both public servers, accessible on the Internet and private servers accessible only through the internal network of the software developer.

FIG. 1 illustrates a diagram of an infrastructure 100, enabling a software developer user to perform local software development, using remote devices. The user may establish one or more instances of a private or user test network 102, to develop software 103 among the user team members. Using the infrastructure 100, the software 103 can be run on a remote device 112. The remote device 112 can be located in a datacenter 116, where multiple remote devices 112 are available for the user to select. The datacenter 116 can provide a variety of types, operating systems, and versions of the remote devices 112 for the user to select. In the cases where the software 103 is a website or a web application, the software 103 can run on a remote device browser (RDB) 109. While the embodiments will be described in reference to the software 103 being a website or a web application, the same technology is applicable to the development of other software programs on the infrastructure 100. The user can access the infrastructure 100 via a remote-enabled local (REL) application 106, provided by the owner or operator of the infrastructure 100. The REL application 106 can be a web application, running on the user local browser (ULB) 105. Alternatively, the REL application 106 can be a desktop application.

The infrastructure 100 can transmit user's input commands from the ULB 105 to the datacenter 116 and inject the commands to the remote device 112 and to the software 103 running on the remote device 112. The process of injecting the user commands can include translating the user input commands to input format compatible with the remote device 112. Furthermore, the user's input commands are entered on a replica display of the remote device 112, generated on the ULB 105, as will be described herein. The infrastructure 100 can provide a video stream of the display of the remote device 112 and display responses of the software 103 to the ULB 105. The user can inspect the responses of the software 103 on the ULB 105. A variety of software and hardware components of the infrastructure 100 can provide the functionality of transmitting user input commands to the software 103, running on the remote device 112 and generating a replica or mirrored display of the remote device 112 on the ULB 105. In some embodiments, the video stream of the display of the remote device 112 is used to generate a replica or mirrored image of the remote device 112 on the ULB 105. The user input commands can be received in the form of interactions with the replica display on the ULB 105. For example, when the remote device 112 is a smart phone, with a touch screen, the user can input taps and touch screen gestures, via mouse clicks, on-screen keyboard inputs, via a laptop or desktop keyboard and so forth. The infrastructure 100 can capture the user interactions with the replica display and transmit them to the remote device 112.

The remote device 112 is connected to the Internet via a host 118 via wired and/or wireless communication. For example, the host 118 can be connected to the remote device 112 via a universal serial bus (USB) connection. The host 118 can be a desktop, laptop or a hardware server compatible with the remote device 112. For example, Windows®, Macintosh®, and Unix® machines can be used to implement the host 118. In some embodiments, the infrastructure 100 can include a remote device application (RDA) 111 installed on the remote device 112, which assists in enabling the operations of the infrastructure 100. The RDA 111 can include a variety of components and processes. A communication module 122 can be used to establish a communication network between the remote device 112 and the ULB 105. For example, in some embodiments, a peer-to-peer communication network over the Internet can be used to establish communication between the remote device 112 and a user local machine running the ULB 105.

The communication network between the ULB 105 and the remote device 112 can include various communication channels, such as video and data communication channels. The video communication channel is used to stream a video feed of the display of the remote device 112 to the ULB 105 and to generate a replica display of the remote device 112 on the ULB 105. The data communication channel is used to capture and transmit the user interactions inputted to the replica display to the remote device 112. The user can interaction with the replica display, as if it had active and interactive components. For example, the user can click on a text field and enter text. The user can click the buttons of an application or website mirrored on the replica display. In the case of a webpage, the user can scroll the replica display, using mouse or keyboard inputs.

An interaction server 120 on the datacenter 116 side can translate the user interactions to input gestures compatible with the remote device 112 and input those translated gestures to the remote device 112, which can in turn input the translated gestures to the software 103. A screen capture application 124 can capture a video feed of the display of the remote device 112 and can transmit the video feed via the video communication channel to the ULB 105. The ULB 105 or an application running on the ULB 105 can use the video feed to generate the replica display. The user interacts with the replica display, and no parallel processes of the software 103 are run on the ULB 105 or the local machine on which the ULB 105 is installed. The RDA 111 can include additional components, such as a media capture module 126, which can assist in capturing user input media, such as voice in instances where the user may wish to inject or test media input to the software 103.

The user test network 102 can include one or more user servers 104 to handle software calls, APIs and other development needs of software 103, locally within the user test network 102. The user test network 102 can be a private network inaccessible to and from the outside networks, or it can be semi-private and connected with public networks, such as the Internet. An operator of the infrastructure 100 can provide a remote-enabled local (REL) application 106, which the user can receive and run in the user test network 102. The operator can further provide a repeater 110 and remote devices 112 to enable the user to develop the software 103, using a remote device 112. The operator in most cases is independent from the user developer team and may have no access to the user test network 102, other than commands and access granted by the user through the REL application 106. The software 103 may be a website and/or a web application, running on the RDB 109. If the device 112 is a smartphone or mobile computing device, the RDB 109 can be a mobile browser, such as Chrome®, Safari®, or another brand of mobile browser. Through tunneling connections, the ULB 105 and the REL application 106 connect with the remote device 112 and the RDB 109, where the RDB 109 issues the software 103 traffic requests on and from the remote device 112. A video feed of the display of the remote device 112 is captured and generated on the ULB 105, for the user to see and inspect the display of the remote device 112. Besides the display of the remote device 112 generated on the replica display on the ULB 105, the infrastructure 100 can also provide the user with various reports and logs and other test and development data about the connections between the ULB 105 and the remote device 112 and/or about the internal processes of the remote device 112, as they relate to the software 103. Test and development data may be accessible via a user interface (UI) element, such as a developer toolbar, as a feature of the REL application 106.

The infrastructure 100 does not run parallel processes at the remote device 112 and the user test network 102, nor does the infrastructure 100 generate mirrored copies of data or processes between the two. In other words, the software 103 does not run in the user test network 102; rather, the remote device 112 runs the software 103. For example, the traffic requests of the software 103 are issued from the remote device 112 and the responses from a public server 114 and/or the user test network 102 are tunneled through the infrastructure 100 and relayed to the remote device 112 and ultimately to the software 103. In other words, the same data packets in a request and/or response are routed, without generating copies of the packets at the two locations. In a typical case, the user/developer may use a desktop, having a keyboard, monitor and mouse to develop and test the software 103 on a remote device 112.

The remote device 112 in a typical case may be a smartphone or tablet device, running a mobile operating system. The infrastructure 100 injects the interactions of the user developer, received on the ULB 105, into the remote device 112. The infrastructure 100 also mirrors the screen output of the remote device 112 on the ULB 105 by streaming a video feed of the display of the remote device 112 to the ULB 105. The mirroring operations of the infrastructure 100 can be considered near real time, save for typical network delays that may be present. Still, the interactions between the user developer and mirrored display of the remote device 112 in the user developer's local machine is seamless and appears, without perceptible delay. The user developer receives a display of a selected remote device 112 on the developer's local monitor and uses keyboard, mouse, or other input devices to interact with the mirrored or replicated display of the remote device 112, as if the remote device 112 were locally present. The user developer's inputs received via local input devices (e.g., keyboard, mouse, etc.) are translated to input gestures compatible with the remote device 112. For example, when the remote device 112 is a smartphone, the user developer's inputs are translated to inputs such as swipes, slides, taps, pinches, or other smartphone gesture inputs. The display output of the remote device 112 is streamed on the local monitor of the user developer in near real time, such that the user developer interactions with the remote device 112 are seamless.

A tunneling agent can establish a tunneling connection 108 between the REL application 106 and a repeater 110. The repeater 110 acts as a proxy, receiving and routing traffic to and from the REL application 106 through the tunneling connection 108. Under normal operating conditions, the tunneling connection 108 is ON during a test session. Furthermore, the infrastructure 100 allows the developer to test software calls to public servers 114 on the internet or other non-user-defined networks. In some implementations, the REL application 106 can alternatively be termed a binary/extension application.

The remote devices 112 can be in a datacenter 116. Multiple datacenters 116 in the form of datacenters or cloud infrastructure backbone can be deployed around the world. Each datacenter 116 can include a substantial number of products, devices, and platforms to enable thousands of users in various geographical locations to test their software on the remote devices 112. For example, the datacenter 116 can include a variety of cellphone brands, cellphone operating systems, different models (new, midmarket, and old versions) of the cellphones, various browsers, and various operating systems, and a combination of devices hardware and software-wise. The datacenter 116 can include multiple copies of the same device and software combination to enable multiple users to use them simultaneously for development. In some embodiments, thousands of devices and platforms are housed in multiple datacenters across different geographical regions to provide the functionality described herein to thousands of software developers. Nearly a million daily test sessions across the infrastructure 100 are typical. In some embodiments, the datacenter 116 can be implemented and deployed in and as a cloud architecture.

Figure 2A:
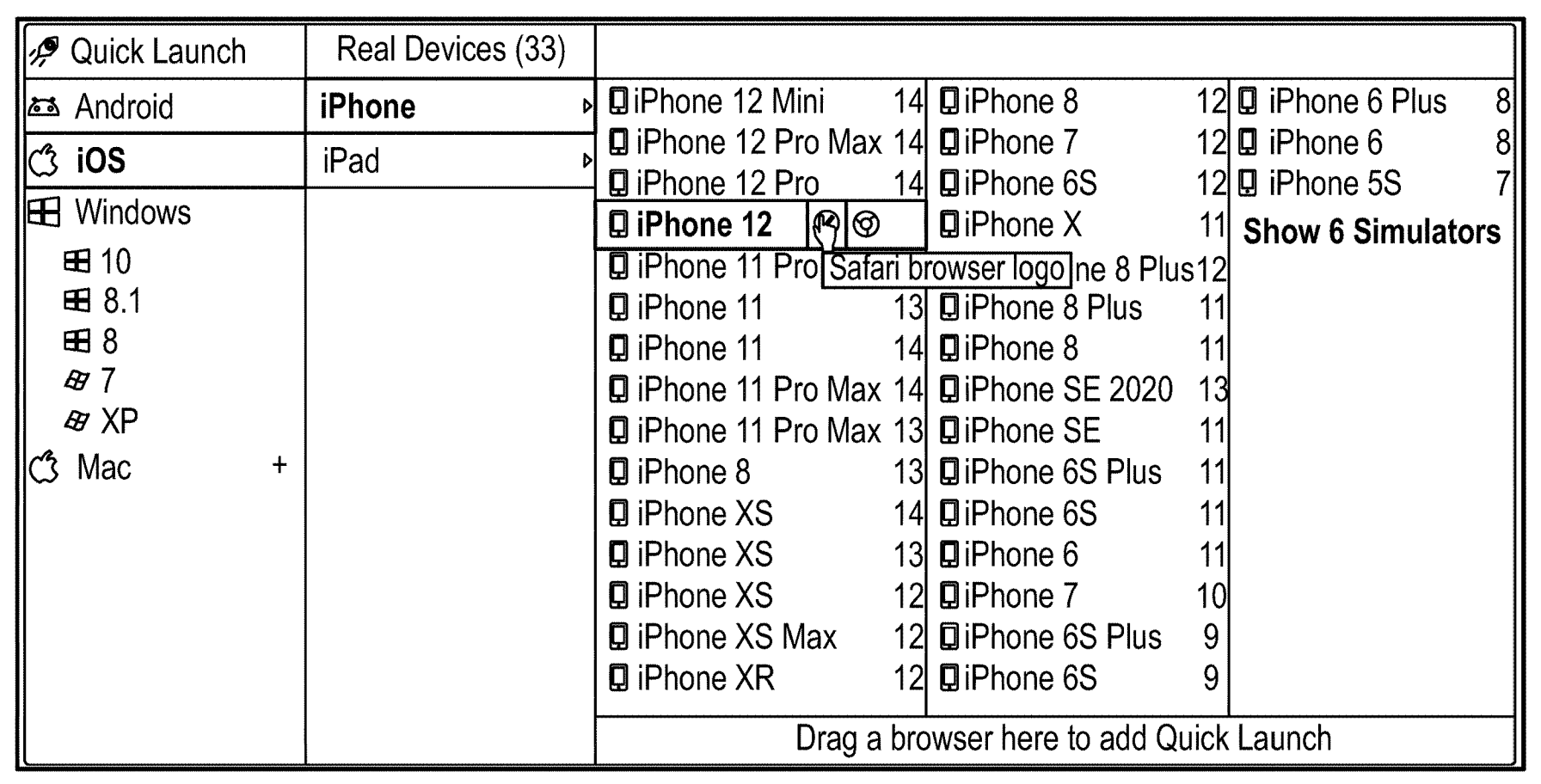

FIG. 2A illustrates an option menu, via which a user developer can choose a smartphone and a corresponding mobile browser, such as RDB 109 to test the software 103. In this example, the user developer runs the REL application 106 locally on his machine via the ULB 105. Alternatively, the REL application 106 may be a desktop application, not needing a browser, such as the ULB 105 to run. The infrastructure 100 can select and configure a remote device 112 and a browser RDB 109 according to the user's selection. In FIG. 2A, the user developer is selecting Safari® on iPhone® 12. Referencing FIGS. 1 and 2A, once the user developer selects a type of a remote device 112 and a browser type RDB 109, a physical remote device 112, matching the user's selection is chosen in a datacenter 116. The chosen remote device 112 is configured with the user selection of the RDB 109 and connected to the REL application 106 through the repeater 110 and the tunneling connection 108.

The software 103 can include any software application or program, including a web application, a website, or other software that a developer may wish to develop and test across multiple platforms. As an example, the software 103 can be a web application or a website, executable and/or accessible on the RDB 109. The user can enter a request in the form of a uniform resource locator (URL) pointing to a host server, hosting the software 103. The user enters the URL in the replica display generated on the ULB 105. The infrastructure 100 captures the entered URL in the replica display and injects it in an address bar field of the RDB109, causing the RDB 109 to issue a request to access the URL entered by the user in the replica display.

Figure 2B:
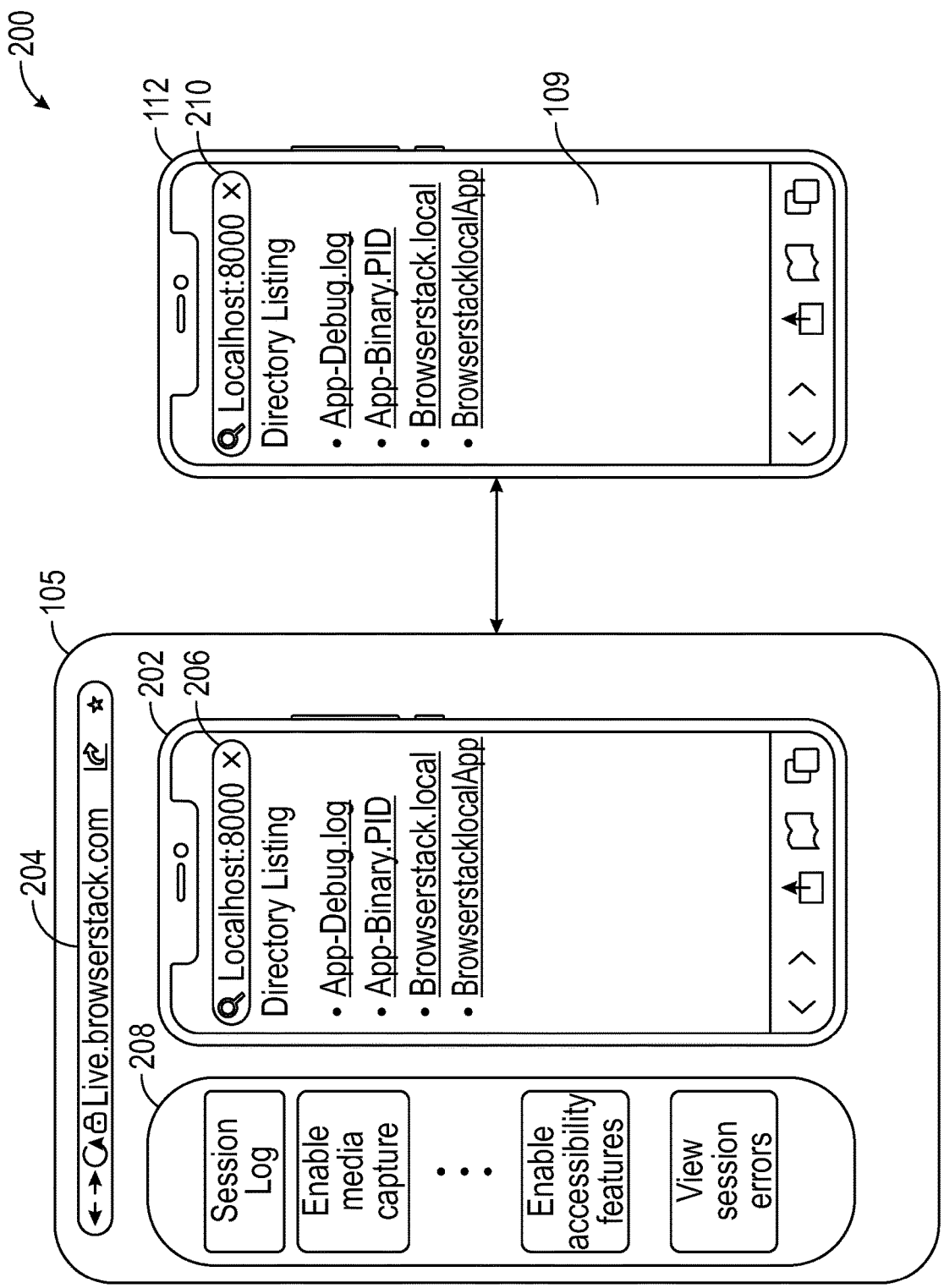
FIG. 2B illustrates a diagram of a user local browser and a remote device browser during a test session of software.

FIG. 2B illustrates a diagram of the ULB 105 and the RDB 109 during a test session of the software 103. The software 103 in this example is a localhost website, accessible via a localhost server resident on the user's local machine. The user's local machine also executes the ULB 105. The user can access the REL application 106 and the infrastructure 100 via entering a URL of the REL application 106 in the address bar 204 of the ULB 105. However, in other implementations the REL application 106 can be a desktop application. The user developer can access various tools of the infrastructure 100 via a developer toolbar 208. The developer toolbar 208 can include items to allow the user developer to enable or disable various features of the infrastructure 100, relating to a test session. For example, enabling or disabling media injection features, enabling or disabling accessibility features, turning ON or OFF viewing of various debugging, session reporting and logging features of the infrastructure 100.

A localhost website is shown as an example for the software 103, the software 103 can be any website accessible on the user's private test network 102 and/or accessible on a public network, such as the Internet. In some embodiments, the user of the infrastructure 100 can test accessing various URLs from the RDB 109 to test how those servers hosting the URLs operate on the RDB 109 and the remote device 112. The user enters a URL request in the replica display 202 in the portion 206 of the replica display 202, which corresponds to the address bar 210 in the RDB 109. The infrastructure 100 captures the user's URL request entered into the portion 206, via the REL application 106 and transmits the URL request to the remote device 112. The URL request is injected into the address bar 210 in the RDB 109. Consequently, the RDB 109 issues the URL request from the remote device 112.

Referencing FIG. 1, the infrastructure 100 includes components to route traffic requests related to the user accessing various URLs from the RDB 109. For example, in some implementations of the infrastructure 100, a proxy server 115 can be installed on the host 118 to receive traffic requests, or URL access requests from the RDB 109. The remote device 112 can be set up with proxy settings 130, which directs the RDB 109 to proxy its traffic to the IP address and port of the host 118. The proxy server 115 receives and forwards the requests to a repeater 110. In some implementations, the repeater 110 is also a type of proxy server. Proxy servers act as intermediaries between request and response, and can provide a variety of functionality, including providing privacy, security, filtering, firewall, speed efficiency, caching, and other functionality. Proxy servers differ in how much exposure they have into the substance of the data they are routing. For example, some proxies implementing SSL inspection have a complete view into the content of the traffic they route, including passwords, and other sensitive data. Other proxy servers, for example, some using the TCP/IP model, may have no access to the payload in the data packets being transmitted, other than some routing information. In a preferred embodiment, both the proxy server 115 and the repeater 110 do not have access to payload or substantive data being transmitted, and only operate on the addresses contained in the data they transmit.

The URLs can broadly include at least two categories. The first category of the user URL requests includes public URLs resolvable to a public host on a public network, such as the Internet. The second category of the user URL requests can include private URLs only resolvable on the user's private test network 102 and to a private host server in the user test network 102. The repeater 110 receives the URL requests from the RDB 109 and resolves the requests. The repeater 110 forwards the public URL access requests to public servers 114. The repeater 110 is not in the user's private test network 102 and cannot resolve private URL access requests. The repeater 110 forwards the private URL access requests to the user's private test network 102. In some embodiments, the REL application 106 receives the private URL access requests from the repeater 110, and since the REL application 106 is running inside the user's private test network 102, it can forward or otherwise resolve the private URL access requests within the user's private test network 102. For example, the REL application 106 can resolve the private URL access requests to one or more user servers 104 inside the user's private test network 102.

Some browsers include an exclusion list of host URLs for security reasons. These browsers do not forward traffic requests for accessing host URLs on their exclusion list. For example, some browsers do not forward requests to access localhost servers to a proxy. In computer networking, a localhost is a host name that refers to the computer that is executing a program. The term is used when making a loopback request to the same computer. In other words, the localhost is a server running on a machine that is only accessible from that machine and refers back to the machine. Software developers use localhost and localhost servers to test and develop their programs. The IP address of a localhost is "127.0.0.1". In other words, typing localhost in the address bar of a browser sends a request from the browser to the "127.0.0.1" IP address. In the infrastructure 100, some user's selection of RDB 109 do not forward URL requests to access a localhost to the proxy server 115. A browser exclusion list can be alternatively referred to as the implicit bypass rules of the browser. When the browser's implicit bypass rules might otherwise prevent a user developer to issue a traffic request from the RDB 109, the infrastructure 100 can modify the URL of the traffic request to avoid the exclusion list or implicit bypass rules of the browser.

Figure 3:
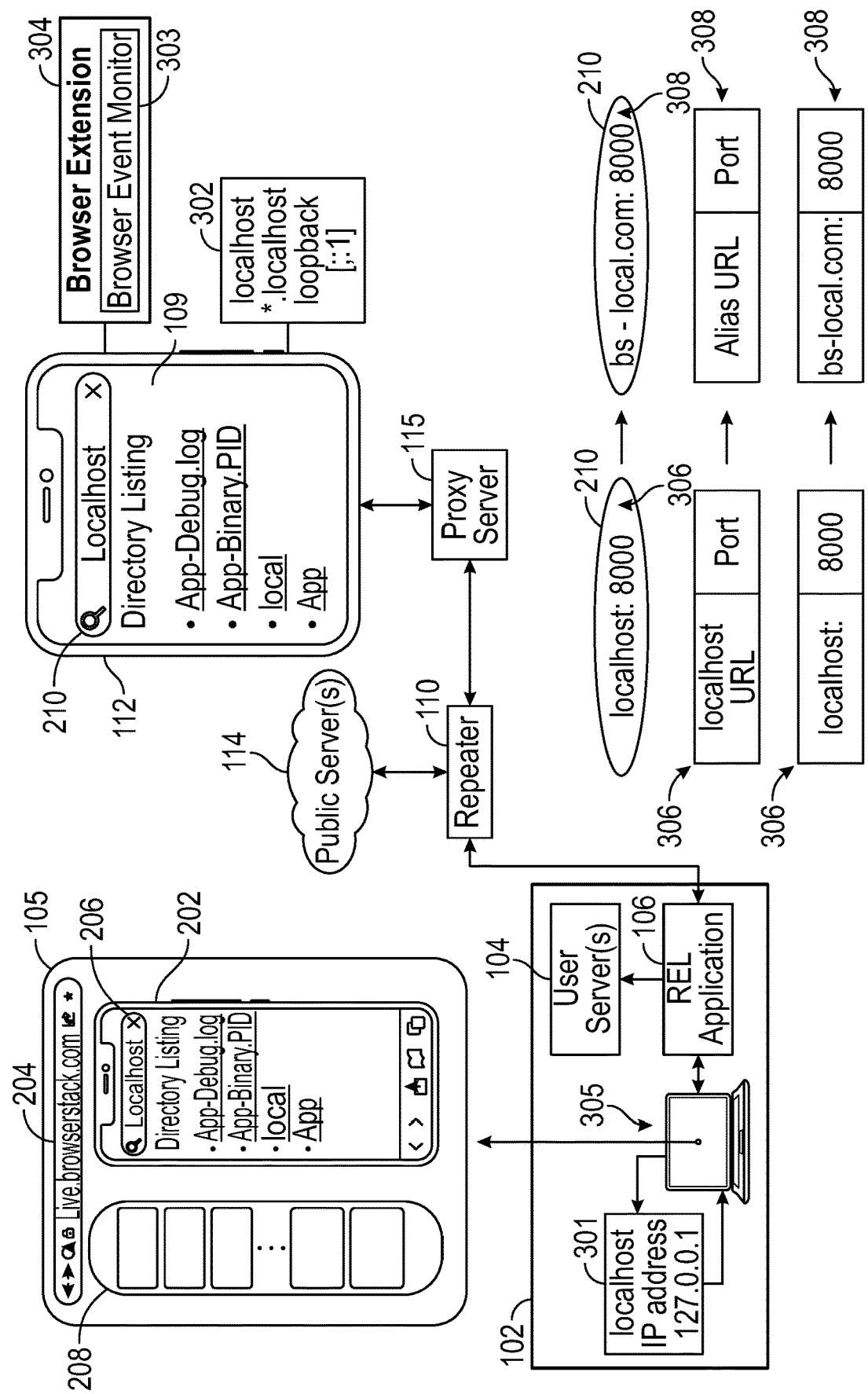
FIG. 3 illustrates a diagram of an example of operations and components of the embodiment of FIG. 1 to avoid an exclusion list of a browser running on the remote device.

FIG. 3 illustrates a diagram of an example of operations and components of the infrastructure 100 to avoid an exclusion list of a browser running on the remote device 112. The user is a developer of software utilizing the infrastructure 100 to conduct test and development activity. In this example, the user has configured a localhost 301 on the user's local machine 305 for the purpose of conducting test and development activity. The user's local machine 305 is part of the user's private test network 102. Besides the localhost 301 running on the user's local machine 305, the user's private test network 102 can also include one or more user servers 104 for the purpose of conducting test and development activity.

The user can access the infrastructure 100, by running the REL application 106 on the user's local machine 305. When the REL application 106 is a browser-based web application, the user can run the REL application 106 by entering a URL provided by the operator of the infrastructure 100 in the address bar 204 of the ULB 105. Using a developer toolbar 208, the user can select a type of platform and a browser to conduct test and development. The infrastructure 100 can select a remote device 112 and an RDB 109, matching the user's selection of the platform and the browser, respectively. The infrastructure 100 can generate a replica display 202 on ULB 105 by streaming a video feed of the remote device 112 to the ULB 105. The user can enter URL requests in the portion 206 of the replica display 202, and the infrastructure 100 can capture and inject the URL requests in the address bar 210 on RDB 109. The RDB 109 can issue the URL requests by forwarding them to a proxy server 115. The proxy server 115 can be resident on the host 118 and in communication with a repeater 110. Proxy settings 130 on the remote device 112 can configure the remote device 112 and/or the RDB 109 to send traffic to the proxy server 115. The repeater 110 determines whether the URL request is for a public server 114 and if yes, forwards the URL request to the public servers 114, receives a response from the public servers 114 and forwards the response back to the remote device 112 and the RDB 109 through the proxy 115. If the repeater 110 cannot resolve a URL request to a public server 114, it assumes the URL request is directed to the user's private test network 102, and forwards the private URL request to the test network 102. The REL application 106 can receive the private URL request and resolve it to a user server 104 within the test network 102. The REL application 106 can also forward the response from the user's server 104 back to the repeater, proxy, the remote device 112 and ultimately the RDB 109 through its tunneling connection.

The RDB 109 can include implicit bypass rules in the form of an exclusion list 302. The URL requests matching the URLs on the exclusion list 302 can be restricted based on one or more rules. For example, the RDB 109 may block forwarding the local host access requests to the proxy 115. In this case, the exclusion list 302 can include URL requests, such as "localhost," "*.localhost," "loopback," "[: : 1]," and other similar URLs. If a user's request injected in the address bar 210 includes one of these items, the RDB 109 does not forward that user request to the proxy 115. Other browsers that do not have these items on their exclusion list or lack implicit bypass rules forward requests to access localhost to proxy 115 and do not block such traffic.

In some embodiments, the RDB 109 can be modified or configured with an auxiliary code or a browser extension 304 to avoid triggering the implicit bypass rules of the RDB 109. The browser extension 304 can modify a URL request injected in the address bar 210 to avoid triggering the bypass rules of the RDB 109. For example, for URL requests matching the exclusion list 302, the browser extension 304 can replace the URL requests with an alias that does not match the URLs on the exclusion list, but points to the same IP address of the original URL. In this manner, the user does not have to modify his workflow and can continue to enter the same URL, even one that is on an exclusion list of a browser, and the browser extension 304 can modify the URL request to avoid triggering the exclusion list of the browser. In some embodiments, the browser extension 304 can include a browser event monitor 303, which listens for browser events and when a new URL request is entered, it can trigger the browser extension 304 to parse the request to detect if any host server name on the exclusion list 302 is embedded in the request. Upon detecting an excluded host server name, the browser extension 304 can replace the host name with an alias URL.

The operator of the infrastructure 100 can provide one or more alias URLs with host names that do not match any items on the exclusion list 302, but nevertheless point to the same IP address of an item on the exclusion list 302. For example, the URL request "localhost," which may be on the exclusion list 302 points to the IP address "127.0.0.1." The operator of the infrastructure 100 can provide an alias URL, for example "bs-local.com," which is not on the exclusion list 302, but points to the same IP address "127.0.0.1." When the RDB 109 receives the URL request "bs-local.com," the implicit bypass rules are not triggered and the RDB 109 forwards the request to the proxy server 115 and the remaining operations of the infrastructure 100 proceed as they would for any other URL requests. In this example, the repeater 110 cannot resolve the URL request "bs-local.com," and forwards it to the REL application 106. The REL application 106 forwards the request to the localhost 301 because the IP address of the domain name or host server "bs-local.com" points to the IP address of the localhost 301.

Some URL requests injected into the address bar 210 include a host name and a port number. For example, the localhost 301, can be accessed via a URL request "localhost: 8000" from the user's local machine 305. The term "localhost" is the host server name, and the number 8000 is the port or the communication endpoint to which this example URL request is pointed. As described earlier, the host server name or URL localhost can be on the exclusion list 302. The browser extension 304 replaces the host server name "localhost," which is on the exclusion list 302 with an alias URL "bs-local.com," but leaves the port information intact. In this manner, the request reaches the same communication endpoint as intended by the user.

In other words, in some cases, a URL request 306 includes localhost URL (for example, "localhost") and a port number. The browser extension 304 parses the URL request 306 and generates a modified URL request 308. The modified URL request 308 includes an alias URL replacing the localhost URL and the same port number as in the original URL request 306. For example, the original URL request 306 entered by the user can be "localhost:8000," and the modified URL request 308 is "bs-local.com:8000." The URL request can include other portions in addition to or instead of a port number. For example, some URL requests include a localhost URL plus path parameters. In these and similar scenarios, the browser extension 304 generates the modified URL request 308 in the same manner, as described above. To generate the modified URL request, the browser extension 304 replaces the localhost portion of the URL request with an alias URL and concatenates and/or adds the additional elements or portions of the original URL request to the alias URL unchanged. For example, a URL request "localhost: 8000/health/" can be modified to "bs-local.com:8000/health/."

Furthermore, in some embodiments, the browser extension 304 operates by detecting that a URL request has been restricted by the RDB 109 as a result of triggering the bypass rules of the RDB 109. The browser extension 304 generates the modified URL request as described above, by replacing the restricted URL portion with an alias URL, not on the exclusion list 302, and forwards the modified URL request to the proxy server 115. In other words, in some implementations, an initial URL request 306 is issued by the RDB 109 and subsequently restricted. The browser extension 304 detects the restriction and generates a modified URL request 308 and forwards the modified URL request 308 to the proxy server 115.

Figure 4:
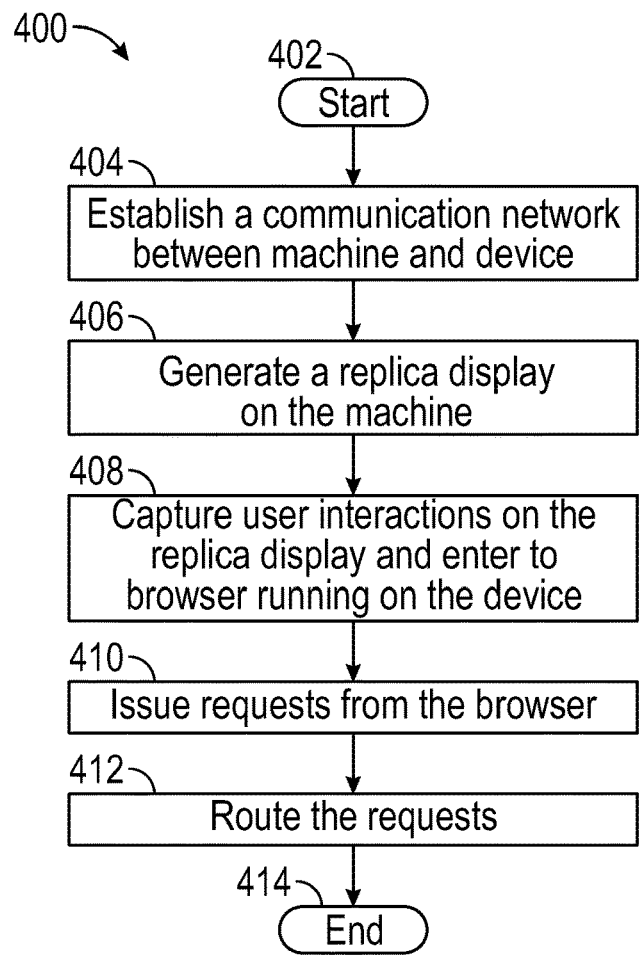
FIG. 4 illustrates an example method of operation of the embodiment of FIG. 1.

FIG. 4 illustrates an example method 400 of operation of the infrastructure 100. The method starts at step 402. At step 404, a communication network between a user local machine 305 and a remote device 112 is established. In one implementation, the communication network can be a peer-to-peer (P2P) communication network, but other communication network methodologies are also possible. The communication network can include a data channel and a video channel. At step 406, the video channel is used to stream a video feed of the display of the remote device 112 to the user local machine 305. At step 408, the infrastructure 100 can capture user interactions with the replica display and transmit them via the data channel to the remote device 112. In some implementations, the user interactions can be captured by the ULB 105. In some embodiments, the user interactions can be entered into a browser running on the remote device. For example, the user interactions can include the user entering URL requests to a portion 206 of the replica display 202 corresponding to an address bar 210 of the RDB 109. At step 410, the browser running on the remote device 112 can issue traffic requests, for example, URL access requests.

At step 412, the infrastructure 100 can route the traffic requests issued from the browser running on the remote device 112. For example, the requests can be received by a proxy server 115 and routed to a repeater 110. The repeater 110 resolves the public server request and routes the remaining requests to a private test network 102 of the user. The responses from the public servers or the private servers of the user network are routed through the repeater and the proxy server back to the remote device and the browser running on the remote device. The method ends at step 414.

Figure 5:
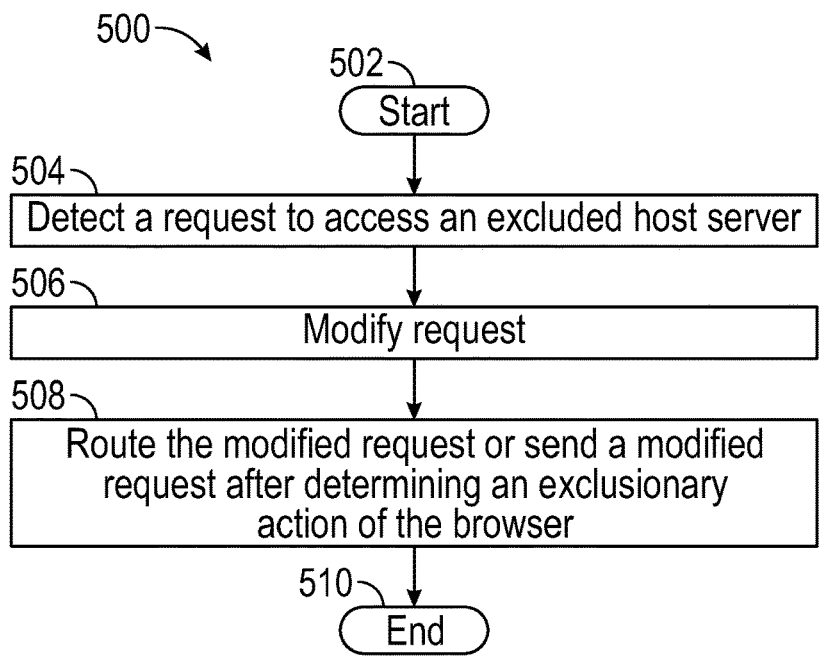
FIG. 5 illustrates an example method of avoiding the implicit bypass rules of a browser.

FIG. 5 illustrates an example method 500 of avoiding the implicit bypass rules of a browser. The method starts at step 502. The browser running on the remote device 112 can include implicit bypass rules, which restricts forwarding or proxying URL requests for certain host servers or domains on an exclusion or restriction list. For example, the browser running on the remote device 112 can restrict proxying URL requests to a localhost. At step 504, a browser extension can detect whether a URL request entered into the browser running on the remote device 112 includes a request for access to a restricted URL found on the browser's exclusion or restriction list. The browser extension can parse the URL requests entered into the browser running on the remote device 112 and match them against the exclusion or restriction list to make that determination. In another embodiment, the URL request can trigger the bypass rules or exclusion list of the browser, and the browser extension can detect the exclusionary action of the browser. Upon detecting the exclusionary action of the browser, the browser extension can receive and modify the URL request.

At step 506, upon determining that the URL requests includes a restricted URL access request, the browser extension can modify the URL request and replace the restricted URL with an alias URL, which has the same IP address of the restricted URL. In some embodiments, the URL request includes a restricted URL portion and a port number. The browser extension can replace the restricted URL portion with an alias URL and leave the port number unchanged. In some embodiments, the restricted URL can include other or additional portions than the port number. For example, a restricted URL access can include portions such as path parameters or other portions depending on the application. In such a scenario, the modification of the URL request can include replacing the restricted URL with the alias URL and concatenating and/or adding the remaining portions into the alias URL to construct the modified URL. For example, "localhost:8000/health/" can be modified to bs-local.com: 8000/health/." The browser extension enters the modified URL to the browser, and the browser routes the modified URL. In another embodiment, where the browser extension catches the restricted URL request after an initial exclusionary action of the browser upon the original request, the browser can send the modified URL. In other words, the browser extension can send the modified request after an exclusionary action upon the original URL request. The modified URL has the same IP address and communication endpoint (e.g., port number) as the original URL request and will reach the same communication endpoint as intended in the user request in the original URL request.

An example of a restricted URL is a localhost server hosted and exposed only via a port number on the user's local machine. Some browsers running on the remote device 112 do not forward requests for access to a localhost to a proxy server. In other words, some browsers do not proxy a URL request to access a localhost. However, the same browsers can route the modified URL, as the modified URL is not on a restriction or exclusion list of the browser. In the case of a proxying restriction of a localhost, the browser extension can replace the host server, "localhost" with an alias URL (e.g., "bs-local.com") that has the same IP address as the localhost (e.g., 127.0.0.1) and leave any port number unchanged. For example, the URL request "localhost: 54455" can be modified to "bs-local.com:54455). At step 508, the infrastructure 100 routes the modified URL, which reaches the same communication endpoint as intended in the user's original URL request. The method ends at step 510.

Figure 6:
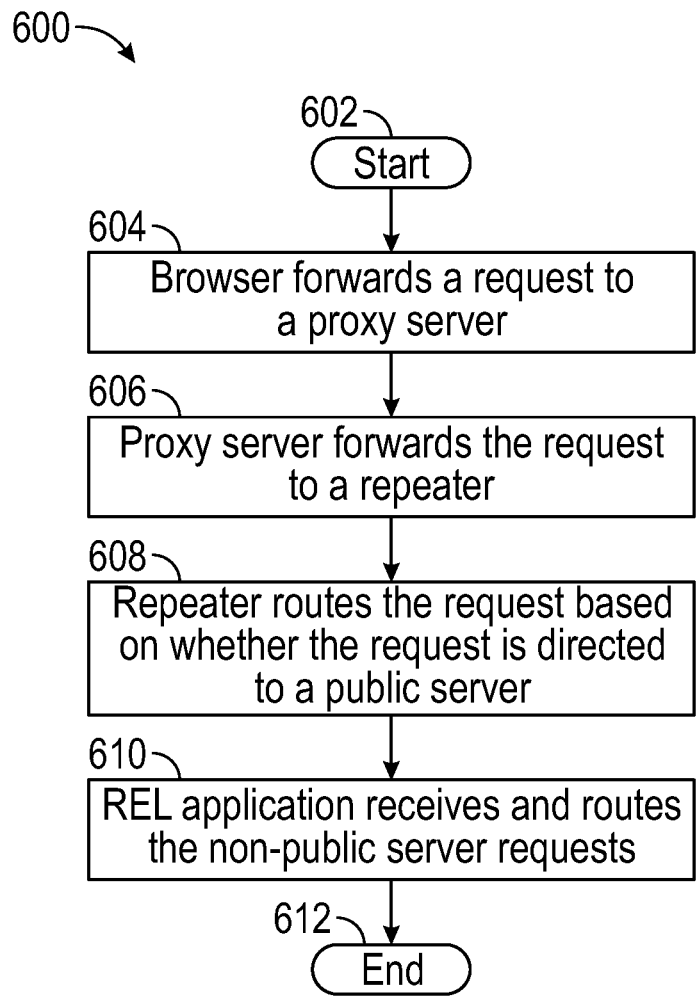
FIG. 6 illustrates an example method of routing traffic and URL requests in the embodiment of FIG. 1.

FIG. 6 illustrates an example method 600 of routing traffic and URL requests in the infrastructure 100. The method starts at step 602. At step 604, the browser running on the remote device 112 forwards a URL request to a proxy server. The browser running on the remote device 112 receives the URL request from a user interaction entered on a replica display of the remote device 112 on the user's local machine 305. Before forwarding the request, a browser extension can detect whether the URL request is for a URL on an exclusion or restriction list of the browser and can modify the URL request with an alias URL if the original URL request includes a host server or URL on the exclusion or restriction list. The alias URL has the same IP address and communication endpoint as the restricted URL. If the URL request is modified, the browser forwards the modified URL request. At step 606, the proxy server forwards the URL request to a repeater. At step 608, the repeater routes the request based on whether the request is directed to a public server. For example, the repeater forwards the public host server requests to a public host server, and if the repeater cannot resolve a URL request to a public server, it forwards the URL request to the user private test network 102. At step 610, a REL application 106 can receive the non-public server requests and resolve it based on domain name system (DNS) rules of the user's private test network 102. In the example of localhost, the REL application can resolve the modified URL requests pointing to a localhost on the same machine as the REL application's machine. The method ends at step 612.

Example Implementation Mechanism Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
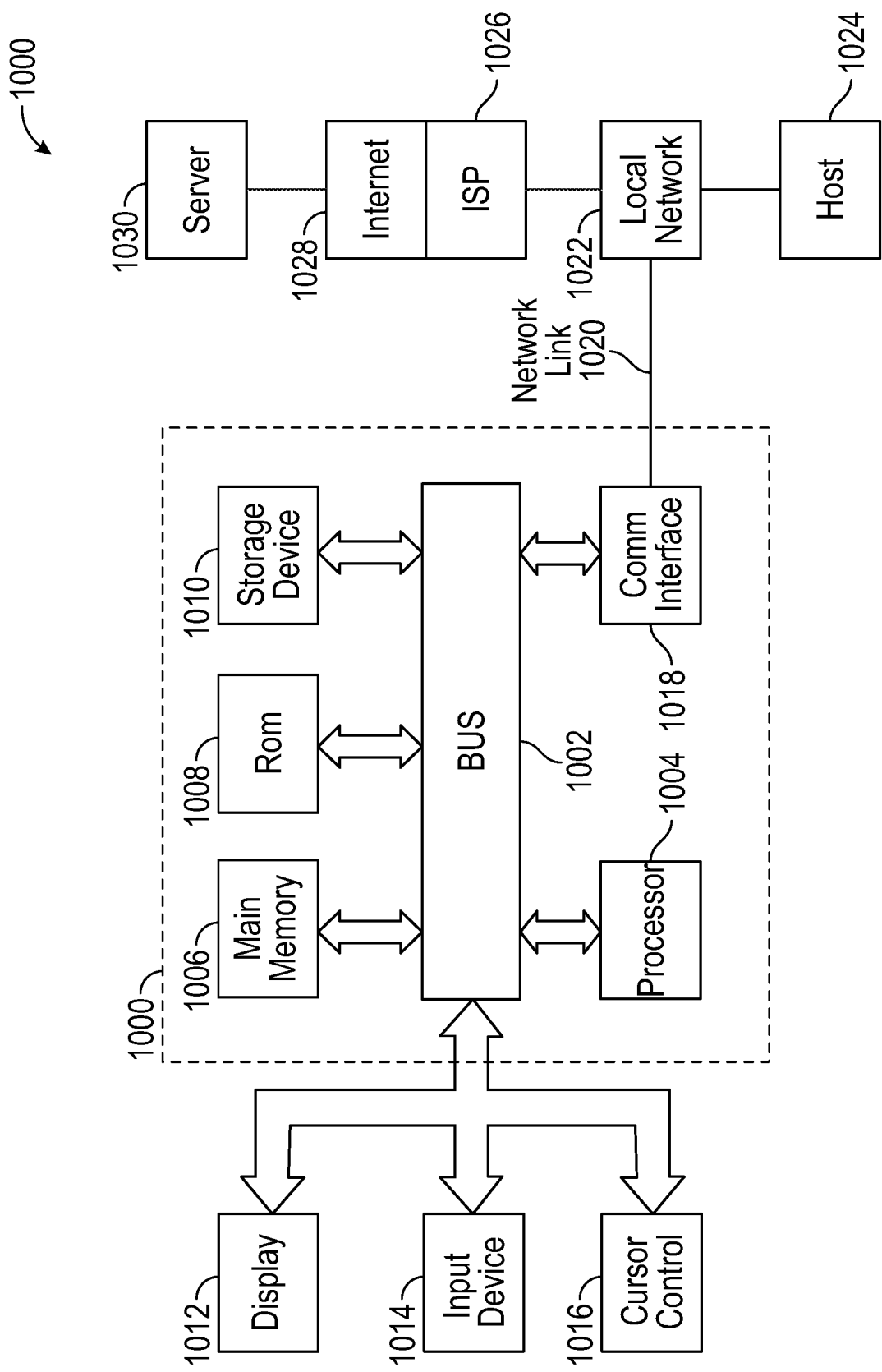
FIG. 7 illustrates an environment in which some embodiments may operate.

For example, FIG. 7 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: establishing a communication network between a first machine and a second machine; executing a browser on the second machine; generating a replica display of the second machine on the first machine; streaming a video feed of a display of the second machine to the first machine; displaying the video feed in the replica display; capturing user interactions with the replica display, wherein the user interactions comprise requests to access host servers; entering the user interactions in an address bar of the browser; issuing the requests from the browser; and routing the requests to the host servers.

Example 2: The method of Example 2, wherein the requests comprise a request to access a host URL on an exclusion list of the browser, and the browser is further configured to replace the request with an alias URL pointing to an IP address of the host URL on the exclusion list.

Example 3: The method of some or all of Examples 1 and 2, wherein the requests comprise a request to access a localhost server on an exclusion list of the browser, and the browser is configured to replace the request with an alias URL pointing to the IP address of the localhost.

Example 4: The method of some or all of Examples 1-3, wherein the first machine is connected to a private communication network and comprises a localhost server wherein the requests comprise a URL of the localhost server portion, wherein the localhost server is on an exclusion list of the browser running on the second machine, and the browser is configured to replace the URL of the localhost server portion of the request with an alias URL pointing to an IP address of the localhost server.

Example 5: The method of some or all of Examples 1-4, wherein routing the requests further comprises: the browser forwarding the requests to a proxy server, wherein the browser comprises an exclusion list of host URLs, wherein the browser does not forward requests for accessing host URLs on the exclusion list, to the proxy server; configuring the browser with an extension, wherein the extension is configured to: detect a request to access a host URL on the exclusion list; and replace the request to access a host URL on the exclusion list with an alias URL, not on the exclusion list, wherein the alias URL points to an IP address of a host URL on the exclusion list.

Example 6: The method of some or all of Examples 1-5, wherein the first machine is connected to a private communication network comprising private host servers, wherein routing the requests further comprises: the browser forwarding the requests to a proxy server; the proxy server forwarding the requests to a repeater; the repeater determining whether a request comprises a request to access a public host server, and routing the request to access the public host server to the public host server; and the repeater determining whether a request is not directed to access a public host server, and routing the request to the private communication network, wherein the private communication network routes the request to a private host server, wherein the first machine runs a localhost server and the browser comprises an exclusion list of host URLs, wherein the browser does not forward to the proxy server, requests comprising the host URLs on the exclusion list, and the method further comprises: configuring a browser extension to receive a request for access to a URL on the exclusion list; modifying the request with an alias URL, the alias URL pointing to an IP address of the localhost server; and the browser forwarding the modified request to the proxy server.

Example 7: The method of some or all of Example 1-6, further comprising: detecting an exclusionary action of the browser comprising the browser restricting forwarding of a request to a host server on an exclusion list of the browser; modifying the request; and routing the modified request to the host server.

Example 8: A non-transitory computer storage that stores executable program instructions that, when executed by one or more computing devices, configure the one or more computing devices to perform operations comprising: establishing a communication network between a first machine and a second machine; executing a browser on the second machine; generating a replica display of the second machine on the first machine; streaming a video feed of a display of the second machine to the first machine; displaying the video feed in the replica display; capturing user interactions with the replica display, wherein the user interactions comprise requests to access host servers; entering the user interactions in an address bar of the browser; issuing the requests from the browser; and routing the requests to the host servers.

Example 9: The non-transitory computer storage of Example 9, wherein the requests comprise a request to access a host URL on an exclusion list of the browser, and the browser is further configured to replace the request with an alias URL pointing to an IP address of the host URL on the exclusion list.

Example 10: The non-transitory computer storage of some or all of Examples 8 and 9, wherein the requests comprise a request to access a localhost server on an exclusion list of the browser, and the browser is configured to replace the request with an alias URL pointing to the IP address of the localhost.

Example 11: The non-transitory computer storage of some or all of Examples 8-10, wherein the first machine is connected to a private communication network and comprises a localhost server wherein the requests comprise a URL of the localhost server portion, wherein the localhost server is on an exclusion list of the browser running on the second machine, and the browser is configured to replace the URL of the localhost server portion of the request with an alias URL pointing to an IP address of the localhost server.

Example 12: The non-transitory computer storage of some or all of Examples 8-11, wherein routing the requests further comprises: the browser forwarding the requests to a proxy server, wherein the browser comprises an exclusion list of host URLs, wherein the browser does not forward requests for accessing host URLs on the exclusion list, to the proxy server, wherein the operations further comprise configuring the browser with an extension, wherein the extension is configured to: detect a request to access a host URL on the exclusion list; and replace the request to access a host URL on the exclusion list with an alias URL, not on the exclusion list, wherein the alias URL points to an IP address of a host URL on the exclusion list.

Example 13: The non-transitory computer storage of some or all of Examples 8-12, wherein the first machine is connected to a private communication network comprising private host servers, wherein routing the requests further comprises: the browser forwarding the requests to a proxy server; the proxy server forwarding the requests to a repeater; the repeater determining whether a request comprises a request to access a public host server, and routing the request to access the public host server to the public host server; and the repeater determining whether a request is not directed to access a public host server, and routing the request to the private communication network, wherein the private communication network routes the request to a private host server, wherein the first machine runs a localhost server and the browser comprises an exclusion list of host URLs, wherein the browser does not forward to the proxy server, requests comprising the host URLs on the exclusion list, and the operations further comprise: configuring a browser extension to receive a request for access to a URL on the exclusion list; modifying the request with an alias URL, the alias URL pointing to an IP address of the localhost server; and the browser forwarding the modified request to the proxy server.

Example 14: The non-transitory computer storage of some or all of Examples 8-13, wherein the operations further comprise: detecting an exclusionary action of the browser comprising the browser restricting forwarding of a request to a host server on an exclusion list of the browser; modifying the request; and routing the modified request to the host server.

Example 15: A system comprising a processor, the processor configured to perform operations comprising: establishing a communication network between a first machine and a second machine; executing a browser on the second machine; generating a replica display of the second machine on the first machine; streaming a video feed of a display of the second machine to the first machine; displaying the video feed in the replica display; capturing user interactions with the replica display, wherein the user interactions comprise requests to access host servers; entering the user interactions in an address bar of the browser; issuing the requests from the browser; and routing the requests to the host servers.

Example 16: The system of Example 15, wherein the requests comprise a request to access a host URL on an exclusion list of the browser, and the browser is further configured to replace the request with an alias URL pointing to an IP address of the host URL on the exclusion list.

Example 17: The system of some or all of Examples 15 and 16, wherein the requests comprise a request to access a localhost server on an exclusion list of the browser, and the browser is configured to replace the request with an alias URL pointing to the IP address of the localhost.

Example 18: The system of some or all of Examples 15-17, wherein the first machine is connected to a private communication network and comprises a localhost server wherein the requests comprise a URL of the localhost server portion, wherein the localhost server is on an exclusion list of the browser running on the second machine, and the browser is configured to replace the URL of the localhost server portion of the request with an alias URL pointing to an IP address of the localhost server.

Example 19: The system of some or all of Examples 15-18, wherein routing the requests further comprises: the browser forwarding the requests to a proxy server, wherein the browser comprises an exclusion list of host URLs, wherein the browser does not forward requests for accessing host URLs on the exclusion list, to the proxy server, wherein the operations further comprise configuring the browser with an extension, wherein the extension is configured to: detect a request to access a host URL on the exclusion list; and replace the request to access a host URL on the exclusion list with an alias URL, not on the exclusion list, wherein the alias URL points to an IP address of a host URL on the exclusion list.

Example 20: The system of some or all of Examples 15-19, wherein the first machine is connected to a private communication network comprising private host servers, wherein routing the requests further comprises: the browser forwarding the requests to a proxy server; the proxy server forwarding the requests to a repeater; the repeater determining whether a request comprises a request to access a public host server, and routing the request to access the public host server to the public host server; and the repeater determining whether a request is not directed to access a public host server, and routing the request to the private communication network, wherein the private communication network routes the request to a private host server, wherein the first machine runs a localhost server and the browser comprises an exclusion list of host URLs, wherein the browser does not forward to the proxy server, requests comprising the host URLs on the exclusion list, and the operations further comprise: configuring a browser extension to receive a request for access to a URL on the exclusion list; modifying the request with an alias URL, the alias URL pointing to an IP address of the localhost server; and the browser forwarding the modified request to the proxy server.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
    establishing a communication network between a local machine and a host machine coupled to a remote device, the remote device running a browser, wherein the browser comprises a URL exclusion list, wherein the remote device comprises proxy settings and is configured to direct traffic to a proxy server comprised in the host machine, wherein the browser does not forward URL access requests to the proxy server when the URL access requests are on the URL exclusion list;
    capturing user interactions on a replica display, the replica display, generated on the local machine, from a video feed of a display of the remote device, wherein the user interactions comprise a URL access request to access a host server, wherein the URL access request corresponds to an IP address of the host server;
    detecting when the URL access request is on the URL exclusion list;
    in response to detecting the URL access request on the URL exclusion list, modifying, with a browser extension of the browser, the URL access request by replacing the URL in the URL access request with an alias URL, wherein the alias URL corresponds to the IP address of the host server;
    issuing the modified URL access request from the browser; and
    routing the modified URL access request from the remote device to the IP address of the host server.

2. The method of claim 1, wherein the local machine is at a first location, and the host machine and the remote device are in a datacenter at a second location, the second location being remote relative to the first location.

3. The method of claim 1, wherein the URL access request comprises a request to access a localhost server on the URL exclusion list, and the browser is configured to replace the request with an alias URL corresponding to an IP address of the localhost.

4. The method of claim 1, wherein the local machine is coupled to a private network and comprises a localhost server wherein the URL access request comprises a URL of the localhost server portion, wherein the URL localhost server portion is on the URL exclusion list, and the browser is configured to replace the URL of the localhost server portion of the URL access request with an alias URL portion corresponding to an IP address of the localhost server.

5. The method of claim 4, wherein the URL access request further comprises a communication path portion, and the browser is configured to leave the communication path portion unchanged.

6. The method of claim 1, wherein the method further comprises:

detecting the browser not forwarding the URL access request to the proxy server.

7. The method of claim 1, wherein the proxy server is configured to route traffic from the remote device, wherein the method further comprises:
configuring the browser, with the browser extension, to detect when the URL access request is on the URL exclusion list;
modifying the URL access request, by replacing the URL in the URL access request with an alias URL, wherein the alias URL corresponds to the IP address of the host server, wherein routing the modified URL access request further comprises:
forwarding the modified URL access request to the proxy server.

8. The method of claim 7, wherein the local machine is coupled to a private network, the private network comprising a private server, configured to resolve URL access requests, wherein the local machine comprises a localhost server, wherein routing the modified URL access request further comprises:
the proxy server forwarding the modified URL access request to a repeater;
the repeater determining whether the modified URL access request comprises a request to access a public server, and routing the request to access the public server to the public server; and
the repeater determining whether the modified URL access request is not directed to access a public server, and routing the request to the private network, wherein the private network routes the request to the private server, wherein the private server forwards the modified URL access request to the localhost.

9. A non-transitory computer storage medium that stores executable program instructions that, when executed by one or more computing devices, configure the one or more computing devices to perform operations comprising:
establishing a communication network between a local machine and a host machine coupled to a remote device, the remote device running a browser, wherein the browser comprises a URL exclusion list, wherein the remote device comprises proxy settings and is configured to direct traffic to a proxy server comprised in the host machine, wherein the browser does not forward URL access requests to the proxy server when the URL access requests are on the URL exclusion list;
capturing user interactions on a replica display, the replica display, generated on the local machine, from a video feed of a display of the remote device, wherein the user interactions comprise a URL access request to access a host server, wherein the URL access request corresponds to an IP address of the host server;
detecting when the URL access request is on the URL exclusion list;
in response to detecting the URL access request on the URL exclusion list, modifying, with a browser extension of the browser, the URL access request by replacing the URL in the URL access request with an alias URL, wherein the alias URL corresponds to the IP address of the host server;
issuing the modified URL access request from the browser; and
routing the modified URL access request from the remote device to the IP address of the host server.

10. The non-transitory computer storage medium of claim 9, wherein the local machine is at a first location, and the host machine and the remote device are in a datacenter at a second location, the second location being remote relative to the first location.

11. The non-transitory computer storage medium of claim 9, wherein the URL access request comprises a request to access a localhost server on the URL exclusion list, and the browser is configured to replace the request with an alias URL corresponding to an IP address of the localhost.

12. The non-transitory computer storage medium of claim 9, wherein the local machine is coupled to a private network and comprises a localhost server wherein the URL access request comprises a URL of the localhost server portion, wherein the URL localhost server portion is on the URL exclusion list, and the browser is configured to replace the URL of the localhost server portion of the URL access request with an alias URL portion corresponding to an IP address of the localhost server.

13. The non-transitory computer storage medium of claim 12, wherein the URL access request further comprises a communication path portion, and the browser is configured to leave the communication path portion unchanged.

14. The non-transitory computer storage medium of claim 9, wherein the operations further comprise:
detecting the browser not forwarding the URL access request to the proxy server.

15. The non-transitory computer storage medium of claim 9, wherein the proxy server is configured to route traffic from the remote device, wherein the operations further comprise:
configuring the browser, with the browser extension, to detect when the URL access request is on the URL exclusion list;
modifying the URL access request, by replacing the URL in the URL access request with an alias URL, wherein the alias URL corresponds to the IP address of the host server, wherein routing the modified URL access request further comprises:
forwarding the modified URL access request to the proxy server.

16. The non-transitory computer storage medium of claim 15, wherein the local machine is coupled to a private network, the private network comprising a private server, configured to resolve URL access requests, wherein the local machine comprises a localhost server, wherein routing the modified URL access request further comprises:
the proxy server forwarding the modified URL access request to a repeater;
the repeater determining whether the modified URL access request comprises a request to access a public server, and routing the request to access the public server to the public server; and
the repeater determining whether the modified URL access request is not directed to access a public server, and routing the request to the private network, wherein the private network routes the request to the private server, wherein the private server forwards the modified URL access request to the localhost.

17. A system comprising one or more processors, the one or more processors configured to perform operations comprising:
establishing a communication network between a local machine and a host machine coupled to a remote device, the remote device running a browser, wherein the browser comprises a URL exclusion list, wherein the remote device comprises proxy settings and is configured to direct traffic to a proxy server comprised in the host machine, wherein the browser does not forward URL access requests to the proxy server when the URL access requests are on the URL exclusion list;

capturing user interactions on a replica display, the replica display, generated on the local machine, from a video feed of a display of the remote device, wherein the user interactions comprise a URL access request to access a host server, wherein the URL access request corresponds to an IP address of the host server;

detecting when the URL access request is on the URL exclusion list;

in response to detecting the URL access request on the URL exclusion list, modifying, with a browser extension of the browser, the URL access request by replacing the URL in the URL access request with an alias URL, wherein the alias URL corresponds to the IP address of the host server;

issuing the modified URL access request from the browser; and routing the modified URL access request from the remote device to the IP address of the host server.

18. The system of claim 17, wherein the URL access request comprises a request to access a localhost server on the URL exclusion list, and the browser is configured to replace the request with an alias URL corresponding to an IP address of the localhost.

* * * * *